United States Patent [19]
Bendler et al.

[11] 3,845,836

[45] Nov. 5, 1974

[54] SAFETY DEVICE FOR VEHICLES

[75] Inventors: Hellmut Bendler, Erlangen-Spardorf; Gunther Marondel, Erlangen, both of Germany

[73] Assignee: Dynamit Nobel AG, Troisdorf, Germany

[22] Filed: May 1, 1972

[21] Appl. No.: 249,150

[30] Foreign Application Priority Data
Apr. 29, 1971 Germany.............................. 2121101

[52] U.S. Cl...... 180/82 C, 242/107 SB, 280/150 SB
[51] Int. Cl...................... B60k 27/00, B60m , B60r
[58] Field of Search............... 180/82 C; 242/107 S; 280/150 S

[56] References Cited
UNITED STATES PATENTS
2,705,529  4/1955  Bull et al........................... 180/82 C
2,883,123  4/1959  Finnigan........................ 280/150 SB
3,172,684  3/1965  Isaac ............................. 280/150 SB
3,240,510  3/1966  Spouge......................... 280/150 SB
3,522,918  8/1970  Wrighton ...................... 280/150 SB
3,606,378  9/1971  Prostran........................ 280/150 SB FOREIGN PATENTS OR APPLICATIONS
1,008,764  11/1965  Great Britain ................ 280/150 SB Primary Examiner—Allen N. Knowles
Attorney, Agent, or Firm—Craig & Antonelli

[57] ABSTRACT

A safety belt for motor vehicles is connected to a tensioning device which is responsive to a deceleration detector for tensioning the belt upon detection of a predetermined degree of deceleration indicating collision with an object. In this way the safety belt can be worn loosely with comfort under normal conditions and the tensioning device will automatiallly provide for tightening the belt to the proper degree to safely restrain the passenger in the event of a collision.

7 Claims, 2 Drawing Figures

PATENTED NOV 5 1974 3,845,836
FIG. 1
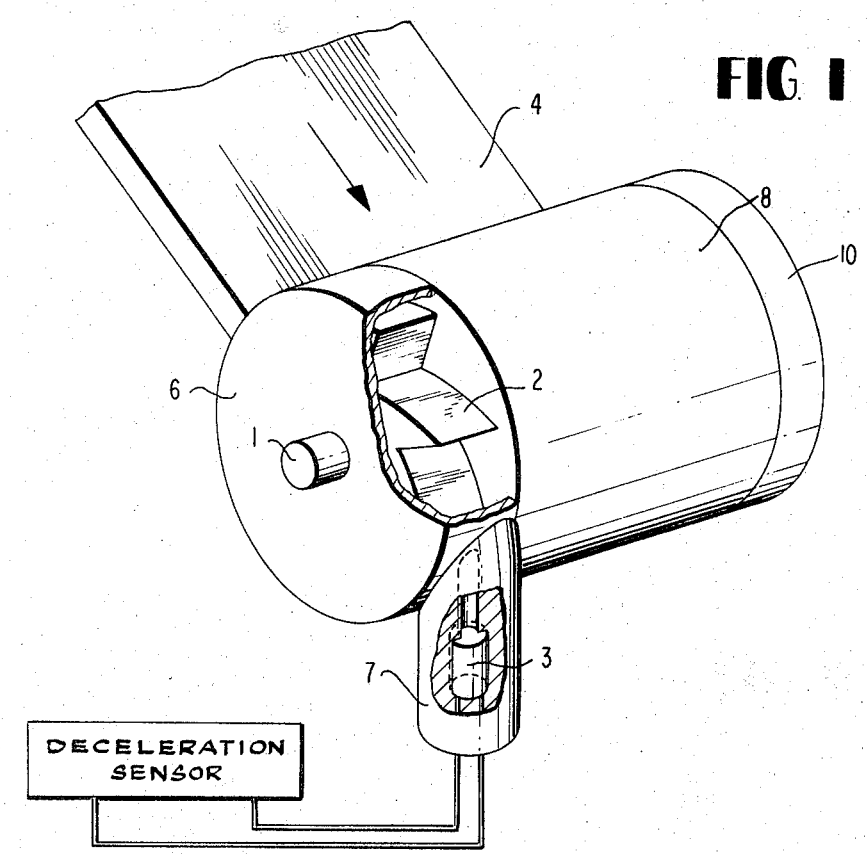
DECELERATION SENSOR
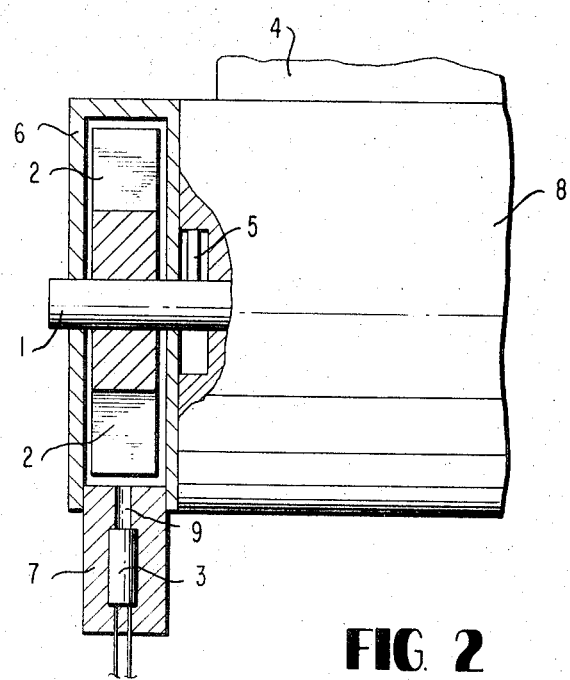
FIG. 2

SAFETY DEVICE FOR VEHICLES

This invention relates to a safety belt for vehicles, particularly for automotive vehicles.

Various safety belt configurations have been provided for airplanes and automotive vehicles which, when worn, protect the occupant or occupants from bodily harm, or at least reduce such physical injuries to an essential extent when a predetermined deceleration value has been exceeded, especially in case of accidents, such as, for example, upon direct collision with an obstacle. Conventional belts are generally provided as slanted shoulder belts, three-point belts, or pelvic belts; however, it has been proven that the advantageous effect of these belts is fully obtained only if, at the instant of the accident and/or collision of the vehicle, the belt has a close contact with the body of the occupant, i.e., if it fits snugly and brakes the movement of the body at the beginning of impact.

In order to ensure a firm contact between the belt and the body of the occupant, safety belts are likewise known wherein the belt is pressed against the body by means of a tensioning device, but wherein the belt can yield in case of slow movements and thus permit a certain freedom of movement under normal conditions. In case of an acceleration of more than 1 g (acceleration due to gravity), these belts are automatically arrested, thus offering the desired protection. However, the constant pressure of the belt upon the body is found to be inconvenient, especially in summer or during warm weather. This has the result, in practice, that, although safety belts are present in many cars, they are not always utilized.

The invention serves the purpose of avoiding the abovementioned disadvantage and, in this connection, proposes to keep the safety belt in operative connection with a tensioning device actuatable by a release member responding when a predetermined value of deceleration of the vehicle has been exceeded. The measure of this invention ensures that a safety belt, which can be worn relatively loosely and thus does not become inconvenient or uncomfortable, is automatically tensioned within a minimum amount of time at the instant of impact in a manner exactly predeterminable in advance, and is pressed against the body of the occupant so that the full desired holding effect is attained when needed to prevent injuries.

In an advantageous further development of the invention, the provision is made to fashion the tensioning mechanism as a wheel, impeller-disc or the like disposed on a shaft fixedly connected with one end of the safety belt and cooperating with a tension roller, tension drum, or the like, provided with blades, fins, or the like. The impeller-disc is preferably provided as a turbine wheel operated by a compressed gas cartridge, and the tension roller is advantageously connecting to the axle via a clutch or other coupling member, preferably a friction coupling. Thereby, it is possible to transmit the acceleration of the wheel to the tension roller in a relatively gentle and elastic manner, and thus to exert a favorable influence on the mechanical stress of the parts and to prevent any damage which would impair the safety of the passenger being restrained by the belt.

In accordance with a further feature of the invention, the provision is made to equip the tensioning device with a locking mechanism which becomes effective automatically to lock the belt in its tensioned condition. In this connection, the locking mechanism should be constructed so that the locking action is ensured at least for a short-term stress.

The invention is shown in the drawing in one embodiment and will be explained in greater detail with reference thereto, as follows:

FIG. 1 is a perspective view partially in section of the tensioning device forming an exemplary embodiment of the invention, and FIG. 2 is a side sectional view of the tensioning device of FIG. 1.

According to FIG. 1, the safety belt 4, in a manner not shown, is fixedly connected at one end with the chassis of the vehicle and at the other end with the axle 1 rotatably mounted in a housing 6 disposed in the vehicle in a stationary manner. This axle could, for example, also be the shaft of a belt windup mechanism, as provided for instance in connection with conventional three-point safety belts. In the housing 6, which also includes a tangentially extending portion 7 for retaining a compressed gas cartridge 3 and is therefore also fixedly arranged in the vehicle, a disc 2 having a turbine-like configuration with a plurality of blades is mounted on the axle 1. This tension roller 8 frictionally coupled via the cam 5, or a differently constructed sliding or friction contact, with the axle 1, to which the disc 2 is also secured. Of course, the disc 2 could also be directly secured to the roller 8 so that both are rotatable together on the axle 1 in the housing 5, or both the disc 2 and the roller 8 can be frictionally mounted on axle 1.

The mode of operation of the device is as follows:

A conventional release device including a sensor (not shown) disposed at a suitable place in the automotive vehicle triggers the ignition of the compressed gas cartridge 3 when a predetermined deceleration value of the vehicle has been exceeded and/or upon an impact with another object, which ignition is preferably effected electrically to provide the proper speed of response. The compressed gas developed thereby is directed through the channel 9 arranged and disposed within the tangentially extending portion 7 so as to be directed against the blades of the disc 2, whereby the disc 2 is set into forceful rotation. Via the cam 5, fixedly mounted on the axle 1 in the same manner as the disc 2, the rotary movement of the disc 2 is transmitted to the tension roller 8 and, via the latter, the belt 4 is wound and tensioned.

The design of the compressed gas cartridge 3 is, of course, adapted to the mass of the impeller-like disc 2, so that an acceleration of the disc 2 is reached which is sufficient for the proper tensioning and/or tightening of the belt 4. For example, the compressed gas cartridge 3 can have an external diameter of about 7 mm. and a length of about 9 mm. The ignition is effected by an electrical current, the strength of which must be about 0.8 – 1 ampere, at an internal resistance of about 1 – 2Ω. Such a compressed gas cartridge generates, within a few milliseconds, up to 70 cm³ of gas, which is sufficient for an adequate driving of the disc 2. One example of such a cartridge is disclosed in U.S. Pat. No. 2,518,958 to Thomson, et al; although, other conventional cartridges of simpler construction may also be used.

The release device provided at an exposed point in the automotive vehicle, preferably in the front section, is suitably connected to the electrical circuit of the automobile.

Since the ignition process takes place within a time span of a few milliseconds, the belt 4 is tensioned, via the impeller disc 2, even before the body of the occupant is set into motion. In order to keep the physical stress exerted on the occupant as small as possible, the disc 2 is suitably accelerated by the gas cartridge only for a short period of time, wherein the connection to the windup mechanism and/or to the tension roller 8 is suitably fashioned, as an additional safety feature, in such a manner that injury to the occupant is excluded. As the powder charge, it is possible, for example, to utilize a mixture as described in U.S. Pat. No. 3,468,730 to Gawlick, et al.

The device of this invention has the advantage of being accessible to control and examination at any time, due to the fact that the electrically ignitable compressed gas cartridges exhibit accurately defined electrical resistances which can be measured via the sensor and/or at a predeterminable control point. In this connection, it is readily possible to trigger, by means of a single release mechanism, i.e., a single sensor, several of these tensioning devices, e.g., four to six at the same time.

However, it is, of course, also possible to effect the release of the compressed gas cartridges 3 mechanically. In this case, a mechanically actuatable sensor, such as disclosed in U.S. Pat. No. 3,415,960, can be employed, which sensor at an acceleration of, for example, 5 – 7 g.'s in the axial direction, i.e., in the direction of the vehicle axis, effects the release and/or ignition of the compressed gas cartridge. The mode of operation of the device of this invention would otherwise be the same as in case of an electrically accomplished triggering.

Provision is also made to equip the tensioning device with a locking device 10, schematically illustrated in FIG. 1, which is of generally known construction and may be of the type used in conventional safety belts. This locking device prevents the unintended release of the safety belt for a time after it has been tensioned in the case of impact. This device can be either directly effective on the belt, or it can fix the belt indirectly by preventing the unintended backward rotation of the tension roller, tension drum or the like, and therefore prevent unreeling of the belt too soon after impact. Since the belt, depending on the mass moment of inertia of the body secured thereby and on the acceleration during the collision, can be placed under a very high tensile stress, the locking device must correspondingly be capable of absorbing very great forces. For this purpose, it is possible, for example, to utilize a pawl stop as it is known for pulleys, cranes, or the like. In principle, this locking device 10 is a disc, rigidly connected to the axle 1, which disc is provided with claws or teeth along its peripheral surface; a detent, latch or pawl fixedly joined to the housing 6 engages in the interspaces of these claws. The configuration of the claws and the detent is conventionally selected so that the disc can be rotated together with the axle 1 in one direction, namely, for the tensioning of the belt, but not in the opposite direction, except when the detent is shifted or pivoted by hand or by a spring member into an unlocking position to such an extent that it no longer engages between the claws of the locking disc.

What is claimed is:

1. Safety belt arrangement for vehicles, especially automotive vehicles, comprising a belt securable at one end to the vehicle and securable at the other end to tensioning means for tensioning said belt, sensor means for detecting a predetermined value of deceleration, and actuator means for operating said tensioning means to tension said belt in response to detection of said predetermined value of deceleration by said sensor means, said tensioning means including an impeller wheel having a plurality of blades disposed for rotation on an axle within a housing, said axle also being connected to said other end of said belt so as to wind said belt upon rotation thereof, said actuator means including compressed gas means mounted on said housing for directing compressed gas against the blades of said impeller wheel to effect rotation of said axle.

2. Safety belt arrangement as defined in claim 1 wherein said compressed gas means includes electrical operating means to release the gas therefrom against the blades of said impeller wheel in response to said sensor means.

3. Safety belt arrangement as defined in claim 1 wherein a tension drum is mounted on said axle, said other end of said belt being secured to said tension drum which is secured to said axle for rotation therewith.

4. Safety belt arrangement as defined in claim 1 wherein a tension drum is frictionally mounted on said axle, said other end of said belt being secured to said tension durm so as to be wound on said drum with rotation of said axle.

5. Safety belt arrangement as defined in claim 4 wherein said compressed gas means includes electrical operating means to release the gas therefrom against the blades of said impeller wheel in response to said sensor means.

6. Safety belt arrangement as defined in claim 5 wherein said tensioning means further includes automatic locking means for locking said impeller wheel against rotation in a direction opposite that provided by said actuator means.

7. Safety belt arrangement as defined in claim 4 wherein said impeller is secured to said axle for rotation therewith and a cam member is provided between said axle and said tension drum for frictionally connecting said tension drum to said axle.

* * * * *